US009648451B1

(12) United States Patent
Lee

(10) Patent No.: US 9,648,451 B1
(45) Date of Patent: May 9, 2017

(54) MULTIPLE MERCHANTS IN CARDLESS PAYMENT TRANSACTIONS AND MULTIPLE CUSTOMERS IN CARDLESS PAYMENT TRANSACTIONS

(71) Applicant: Square, Inc., San Francisco, CA (US)

(72) Inventor: Bob Lee, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 83 days.

(21) Appl. No.: 14/491,774

(22) Filed: Sep. 19, 2014

Related U.S. Application Data

(62) Division of application No. 13/802,064, filed on Mar. 13, 2013, now Pat. No. 9,264,850.

(60) Provisional application No. 61/728,760, filed on Nov. 20, 2012.

(51) Int. Cl.
*H04W 4/02* (2009.01)
*G06Q 20/32* (2012.01)

(52) U.S. Cl.
CPC .......... *H04W 4/02* (2013.01); *G06Q 20/3224* (2013.01)

(58) Field of Classification Search
CPC .......... H04W 4/00; H04W 4/02; H04W 64/00
See application file for complete search history.

(56) References Cited

U.S. PATENT DOCUMENTS

| | | | |
|---|---|---|---|
| 7,620,404 B2 | 11/2009 | Chesnais et al. | |
| 2007/0150414 A1* | 6/2007 | Templeton | G06Q 20/102 705/40 |
| 2008/0147507 A1* | 6/2008 | Langhammer | G06Q 30/02 705/14.1 |
| 2009/0043696 A1* | 2/2009 | Ornce | G06Q 20/10 705/39 |
| 2009/0216676 A1* | 8/2009 | Mathur | G06Q 20/32 705/44 |
| 2013/0002840 A1 | 1/2013 | Toney et al. | |
| 2016/0259616 A1 | 9/2016 | Hosein et al. | |

OTHER PUBLICATIONS

Notice of Allowance mailed Oct. 13, 2015, for U.S. Appl. No. 13/802,064, of Lee, B., filed Mar. 13, 2013.
Restriction Requirement mailed Sep. 3, 2014 for U.S. Appl. No. 13/802,064 of Lee, B., filed Mar. 13, 2013.

(Continued)

*Primary Examiner* — Kamran Afshar
*Assistant Examiner* — Farideh Madani
(74) *Attorney, Agent, or Firm* — Lee & Hayes, PLLC

(57) ABSTRACT

A method includes receiving a request for a list of nearby user devices, where the list of nearby user devices will be sent to a merchant device, where the merchant device is associated with a merchant, where the merchant operates a plurality of merchant devices, and where the merchant device is included in the plurality of merchant devices; receiving a respective location for one or more user devices, where each user device is associated with the merchant; determining, for each of the one or more user devices, whether the user device is nearby the merchant device, based on the respective location, to the merchant device than the other merchant devices in the plurality of merchant devices; generating the list of nearby user devices based at least on the determination; and sending the list of nearby user devices to the merchant device.

18 Claims, 10 Drawing Sheets

(56) References Cited

OTHER PUBLICATIONS

Non Final Office Action mailed Dec. 1, 2014 for U.S. Appl. No. 13/802,064 of Lee, B., filed Mar. 13, 2013.
Final Office Action mailed Mar. 20, 2015 for U.S. Appl. No. 13/802,064 of Lee, B., filed Mar. 13, 2013.
Non Final Office Action mailed Mar. 1, 2017, for U.S. Appl. No. 14/941,020, of Lee, B., filed Nov. 13, 2015.

* cited by examiner

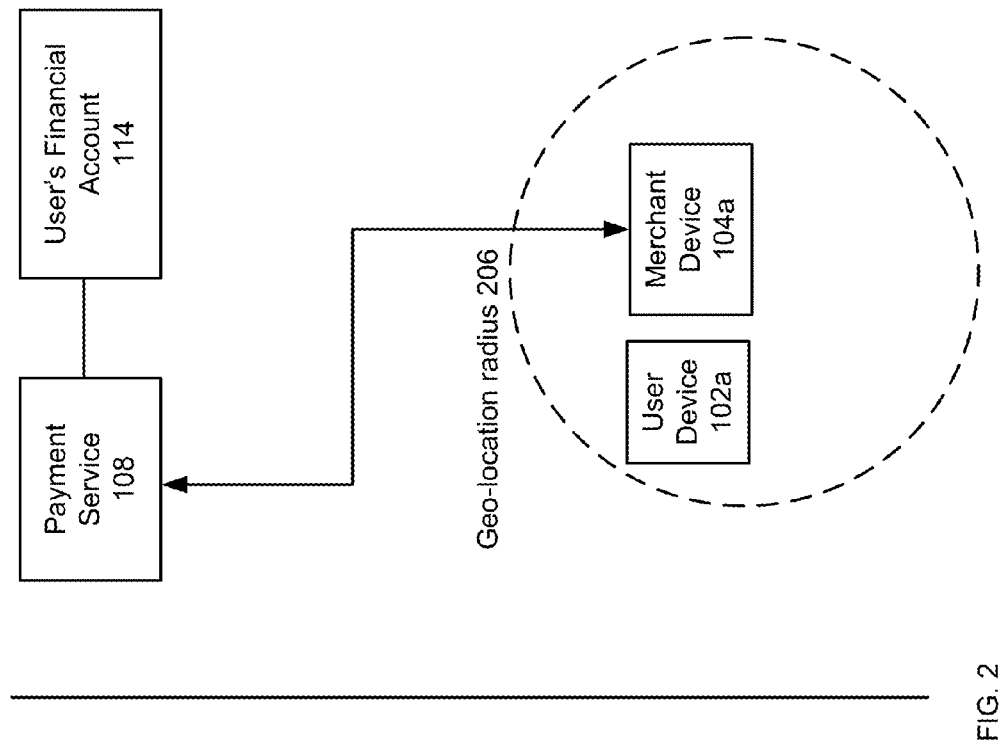
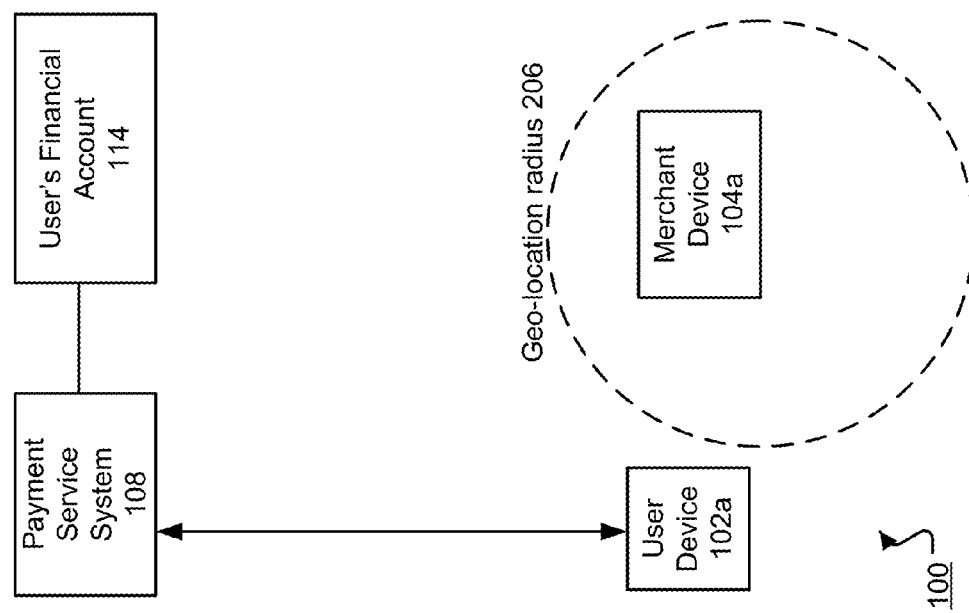
FIG. 2

MULTIPLE MERCHANTS IN CARDLESS PAYMENT TRANSACTIONS AND MULTIPLE CUSTOMERS IN CARDLESS PAYMENT TRANSACTIONS

CROSS REFERENCE TO RELATED APPLICATIONS

This application is a divisional application of, and claims priority to, U.S. patent application Ser. No. 13/802,064, filed on Mar. 13, 2013, which is a non-provisional of, and claims priority to, U.S. Provisional Patent Application No. 61/728,760, filed on Nov. 20, 2012, the entire contents of which are herein incorporated by reference.

TECHNICAL FIELD

This disclosure relates to multiple merchants and multiple customers for cardless payment transactions.

BACKGROUND

In a conventional point-of-sale electronic credit card transaction, the transaction is authorized and captured. In the authorization stage, a physical credit card with a magnetic stripe is swiped through a merchant's magnetic card reader, e.g., as part of a point-of-sale device. A payment request is sent electronically from the magnetic card reader to a credit card processor. The credit card processor routes the payment request to a card network, e.g., Visa or Mastercard, which in turn routes the payment request to the card issuer, e.g., a bank. Assuming the card issuer approves the transaction, the approval is then routed back to the merchant. In the capture stage, the approved transaction is again routed from the merchant to the credit card processor, card network and card issuer, and the payment request can include the cardholder's signature (if appropriate). The capture state can trigger the financial transaction between the card issuer and the merchant, and optionally creates a receipt. There can also be other entities, e.g., the card acquirer, in the route of the transaction. Debit card transactions have a different routing, but also require swiping of the card.

Many transactions require that the customer sign a physical receipt, electronically approve a transaction, e.g., by pressing an approve button on a user interface, electronically sign for the transaction, e.g., with a stylus or finger on an electronic signature capture device with a touch sensitive pad, or enter an authorizing personal identification number (PIN).

Customers can conduct transactions with merchants that have multiple point-of-sales. The points-of-sale can be within one store location or across multiple store locations.

SUMMARY

Merchants can have multiple points-of-sale provided by multiple merchant devices. A system can provide information about nearby customers to nearby merchant devices and not other more distant merchant devices. Similarly, customers can search for multiple merchant devices. If multiple devices are associated with a common merchant, the system can provide a customer with the common merchant. The system determines the information provided to the merchants and customers based on locations of user (e.g., customer) devices and merchant devices.

On the one hand, it would be generally convenient for a customer to dispense with swiping of a credit card. On the other hand, the risk of unauthorized transactions is a potential problem in a cardless payment transaction. An approach for conducting an electronic payment transaction without swiping a card is for the customer to provide authorization that particular merchants can perform a cardless payment transaction, and for such transactions to only be authorized when the customer is within a predetermined distance of the merchant, e.g., as sensed by the customer's mobile device.

In one aspect, a method includes receiving a request for a list of nearby user devices, where the list of nearby user devices will be sent to a merchant device, where the merchant device is associated with a merchant, where the merchant operates a plurality of merchant devices, and where the merchant device is included in the plurality of merchant devices; receiving a respective location for one or more user devices, where each user device is associated with the merchant; determining, for each of the one or more user devices, whether the user device is nearby the merchant device, where being nearby requires at least determining that the user device is geographically closer, based on the respective location, to the merchant device than the other merchant devices in the plurality of merchant devices; generating the list of nearby user devices based at least on the determination; and sending the list of nearby user devices to the merchant device.

Implementations can include one or more of the following. The user device is associated with the merchant if the merchant has an indication of consent of the user device to perform a payment transaction with the merchant. If the user device is nearby the merchant device, the list of nearby user devices includes the user device. If the user device is geographically closer to one of the other merchant devices than the merchant device, the list of nearby user devices does not include the user device. If the user device is similarly distant, within a threshold margin, from the merchant device and from one of the other merchant devices, the list of nearby user devices includes the user device.

In another aspect, a method includes receiving a request for a list of nearby merchant devices, where the list of nearby merchant devices will be sent to a user device; identifying a first plurality of merchant devices around a location of the user device; identifying one or more pluralities of children merchant devices in the first plurality of merchant devices, where each merchant device in a plurality of children merchant devices is associated with a common merchant, and where each plurality of children merchant devices is associated with a unique merchant; determining, for each of the one or more pluralities of children merchant devices, whether one or more merchant devices in the plurality of children merchant devices is within a radius around the location of the user device; generating the list of nearby merchant devices based at on the determination; and sending the list of nearby merchant devices to the user device.

Implementations can include one or more of the following. In the determining, for each of the one or more pluralities of children merchant devices, if a merchant device in the one or more merchant devices is outside the radius, the list of nearby devices includes the merchant device. If more than one merchant device in the second plurality of merchant devices is within the radius, generating the list of nearby devices to include one of the merchant devices. The one of the merchant devices is the merchant device geographically closest to the user device. The one of the merchant devices is a primary sales device of the merchant. The request includes the location of the user device.

Advantages may include one or more of the following. From a merchant's perspective, a cardless payment system can provide information about nearby customers to nearby merchant devices and not other more distant merchant devices. From a user's perspective, when searching for nearby merchants, users can be provided with the identity of one merchant even though the merchant can have multiple merchant devices at the merchant location.

BRIEF DESCRIPTION OF THE DRAWINGS

FIG. 2 is a diagram of an example implementation of the cardless payment system.

Like reference numbers and designations in the various drawings indicate like elements.

DETAILED DESCRIPTION

As an overview, the system allows a user and a merchant to conduct cardless payment transactions. Merchants can use multiple merchant devices per merchant location. The system also allows a user (also called a customer or payer) to purchase items from a merchant while physically present at the merchant, e.g., at any merchant point of sale, but using a cardless payment transaction. A cardless payment transaction is one where a user conducts the transaction with a merchant at a point of sale using a financial account without physically presenting a payment card to the merchant at the point of sale. In fact, the merchant need not receive any details about the financial account, e.g., the credit card issuer, credit card number, and the like is not provided to the merchant.

From the user's perspective, the user first signs up for an account with the cardless payment system. The sign-up process requires certain information, such as information about a financial account sufficient to perform a transaction with the account. For example, if the financial account is a credit card account, then credit card information can be provided, e.g., credit card number and expiration date. The user can also sign up with other payment methods such as debit cards, pre-paid cards, bank accounts, or other third party financial accounts. The sign up process can also require contact information for the user, e.g., mailing address and email, and other personal identifying information, e.g., a photograph of the user. After creating an account, the user can select a merchant that also has an account with the cardless payment system. The user can give consent to perform a cardless payment transaction with the merchant if the user is within a predetermined distance from the merchant. After the user gives consent, the merchant can, without a presentment of the physical payment card, charge (in the case of credit cards) or debit (in the case of debit cards) the user's financial account for items the user wants to buy. Because the user's payment card is already on file with the cardless payment system, the user does not need to physically present a credit card to the merchant.

Figure 1:
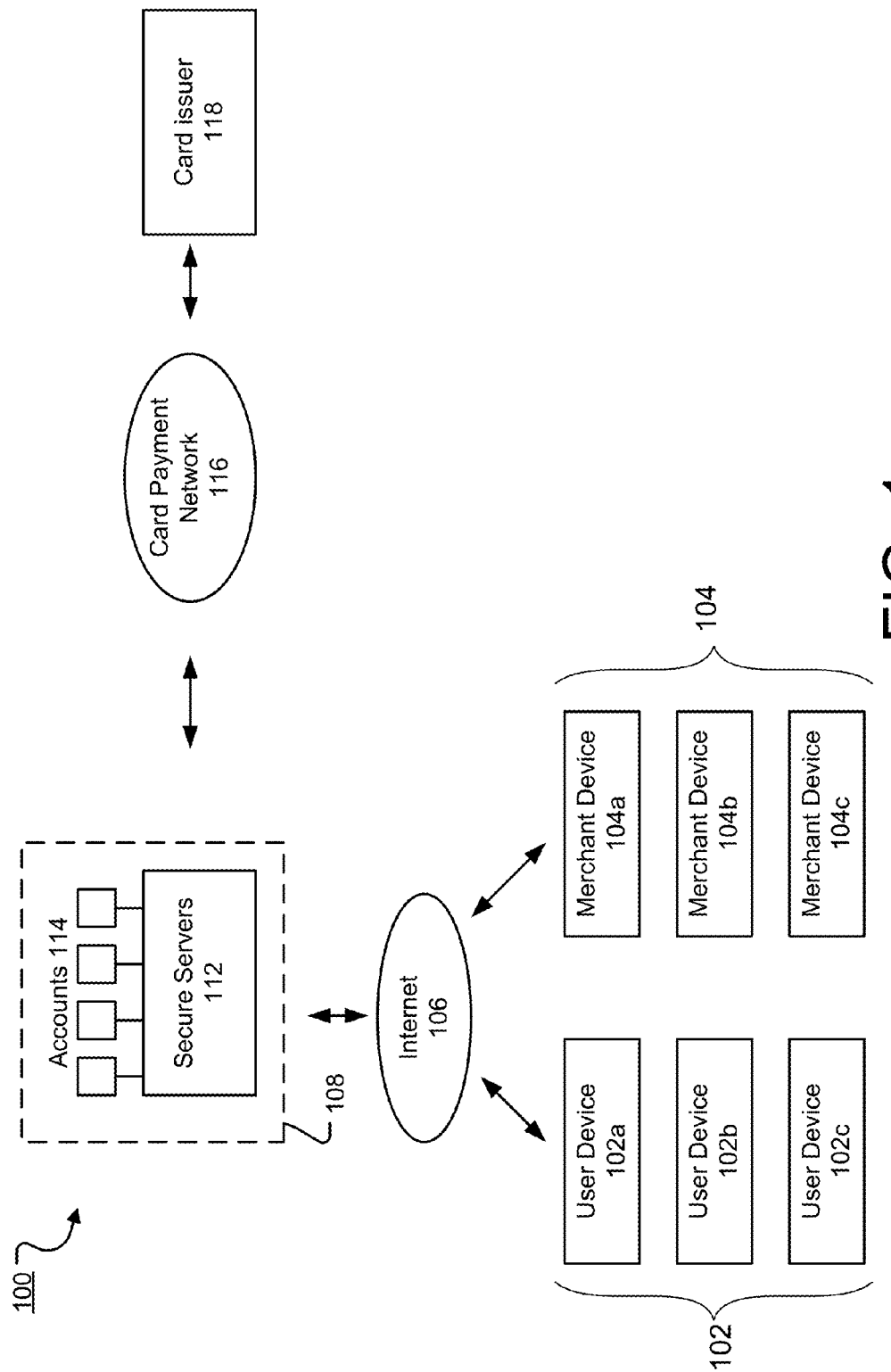
FIG. 1 is a schematic illustration of an example cardless payment system architecture.

FIG. 1 is a schematic illustration of the architecture of an example cardless payment system 100. The overall system 100 includes multiple user devices 102, e.g., devices 102a, 102b, 102c, and multiple merchant devices 104, e.g., devices 104a, 104b, 104c, connected to a network, e.g., the Internet 106. However, in some implementations, the overall system 100 could have a single user device and multiple merchant devices, or multiple user devices and a single merchant device. Each user device 102a, 102b, 102c is a mobile computing device, i.e., a hand-held computing device, capable of running a user application. For example, the user device can be a smartphone or tablet computer. Each merchant device 104a, 104b, 104c is also a computing device, capable of running a merchant application. The merchant device can be a mobile device, or it can be a desktop computer, a laptop computer, a dedicated point of sale system, or other data processing apparatus.

A cardless payment processor operates a payment service system 108. The user and merchant devices can communicate with the payment service system 108 using the network 106. The payment service system 108 includes one or more servers 112, at least some of which can handle secure transactions (e.g., a secure server), to processes all transactions between the user devices 102 and merchant devices 104. In general, servers 112 can store public merchant information such as the merchant's address or phone number. The servers 112 can also be responsible for transferring or updating the user application to the user's mobile device or transferring or updating the merchant application to the merchant's computing device. In particular, the servers 112 can be responsible for sending information about merchants that have accounts with the cardless payment system to the user devices 102. The servers 112 also handle secure information such as credit card numbers, debit card numbers, bank accounts, user accounts, user identifying information or other sensitive information.

The payment service system 108 can communicate electronically with a card payment network 116, e.g., Visa, Mastercard, or the like. The payment service system 108 can communicate with a computer system 116 of a card payment network, e.g., Visa or MasterCard. The payment service system 108 can communicate with a computer system 116 over the same network 106 used to communicate with the user devices 102, or over a different network. The computer system 116 of the card payment network can communicate in turn with a computer system 118 of a card issuer, e.g., a bank. There can also be computer systems of other entities, e.g., the card acquirer, between the payment service system 108 and the card issuer.

Before a transaction between the user and the merchant can be performed using the cardless payment system, the user must create a user account with the payment service system 108 and the merchant must create a merchant account with the payment service system 108.

The user can sign up using a mobile application or using an online website, and can use a mobile device or another computing device, e.g., a home computer. At some point prior to the transaction, a user application is downloaded to the user device, e.g., through an application store. Creation of the user account can be handled through the user application, or through another application, e.g., a generic web browser. The user enters a name, account password, and contact information, e.g., email address. Before a transaction can be performed, the user also enters financial account information sufficient to conduct the transaction into the payment service system 108. For example, in the case of a credit card account, the user can enter the credit card issuer, credit card number and expiration date into the payment service system 108; the card validation value and mailing address may also be required. However, the financial account could also be associated with a debit card or pre-paid card, or another third party financial account.

In some implementations, the payment service system 108 requires additional personal identifying information before a transaction can be performed. For example, the payment service system 108 may require a photo of the user before a transaction can be performed. The photo of the user would be provided to the merchant so that the merchant can compare the photo to the person. In addition, the payment service system 108 can require a personal identification number (PIN) be entered by the user. Other requirements can also be added to increase security. The data associated with a user account 114 can be stored at the servers 112, e.g., in a database.

If the user is signing up with a mobile application, the user's financial account information can be entered by swiping the financial transaction card through a slot of a card reader coupled to the user's mobile device. Alternatively, the user can enter in financial account information by typing in information at the mobile device, selecting a card from an application on the mobile device, from an online entity, or others. In some implementations, another external application generates a receipt that is sent to the user. The receipt then includes a hypertext link that allows a user to easily create a user account in the cardless payment system. For example, activating the link in the receipt can automatically create a user account with a payment card prefilled with the card used in the receipt to reduce effort by the user. In effect, activating a new account using a receipt auto-verifies the user into the cardless payment system.

The merchant can sign up for an account using a merchant device, e.g., 104a, 104b, 104c, or another device. The merchant enters a name, account password, and contact information, e.g., email address, and physical location information, e.g., an address, into the payment service system 108. The merchant can also provide other information, e.g., a list of goods or services available, operating hours, phone number, a small identifying image logo or mark, to the payment service system 108. The data associated with the merchant account 114 can be stored at the servers 112, e.g., in a database.

At some point prior to the transaction, a merchant application is downloaded to the merchant device, e.g., through an application store. Creation of the merchant account can be handled through the merchant application, or through another application, e.g., a generic web browser.

Eventually, in order to receive funds from the transaction, the merchant will need to enter financial account information into the payment service system sufficient to receive funds. For example, in the case of a bank account, the user can enter the bank account number and routing number. However, the merchant's financial account can also be associated with a credit card account or another third party financial account. In addition, in some implementations, if the merchant has not entered the financial account information, the cardless payment processor can hold the received funds until the financial account information is provided.

FIG. 2 is a diagram that outlines an example implementation of the cardless payment system 100. A user carries a mobile device 102a with the user application installed, and a merchant has a device 104a with the merchant application installed. Users and merchants each have an association, e.g., an account, with the payment service system 108.

Each merchant can be associated with multiple merchant devices. The merchant can obtain device identifications for each merchant device and provide the device identifications to the payment service system 108, e.g., saving the device identifications using the merchant application. The payment service system 108 can determine whether a merchant device is associated with the merchant based on the provided device identification. Alternatively, each merchant device can run the merchant application, and the merchant can link the merchant device to the merchant using an interface of the merchant application.

The system can predetermine a geo-location distance 206, e.g., a radius, around the location of the merchant. In some implementations, the geo-location distance 206 is 500 feet. In some implementations, the geo-location distance 206 can be set by the merchant, e.g., the payment service system 108 receives input from the merchant device 104 or another computer system of the merchant setting the location radius. In some implementations, the payment service system 108 may limit the radius set by the merchant to a maximum location radius.

If the user device is located outside the geo-location radius 206 of the merchant, the merchant application does not provide an option to conduct a cardless payment transaction with the user. In this case, the user device 102a will indicate it is outside the geo-location radius 206 of the merchant, and the user device 102 can provide more information about the merchant. However, the merchant device 104a will be unable to charge the user's financial account, as further described in reference to FIG. 3.

Figure 3:
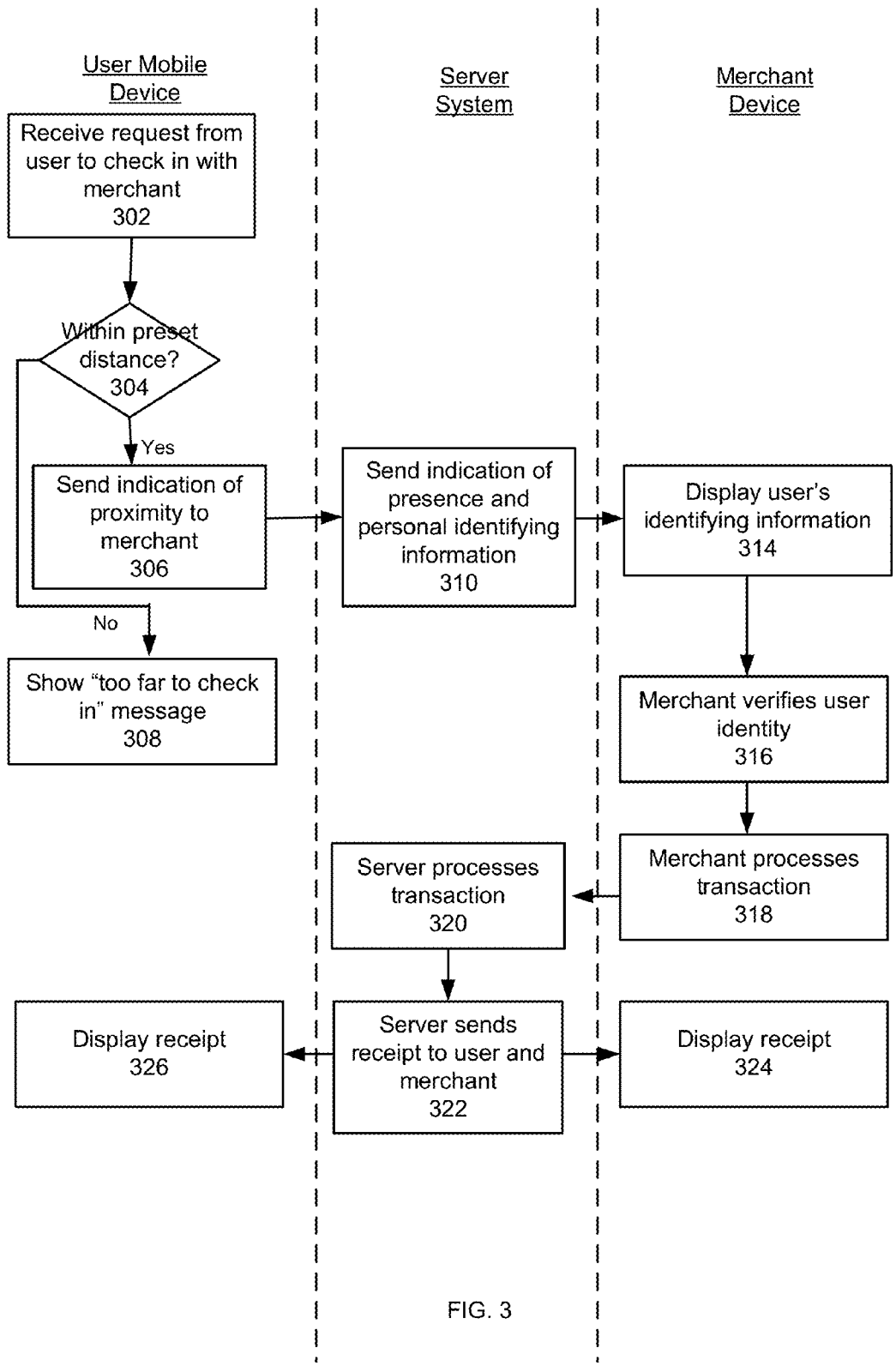
FIG. 3 is a diagram of an example flow chart of the cardless payment system.
Figure 9:
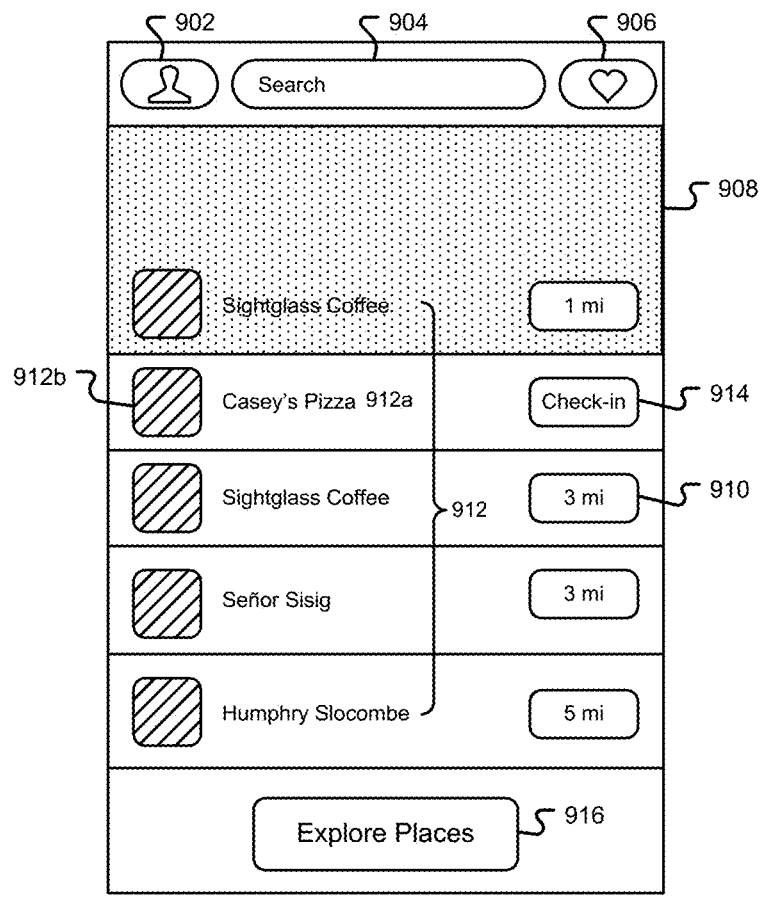
FIG. 9 is a diagram of an example user interface on a customer device.

If the user device 102a is located within the geo-location radius 206 of the merchant, the user can "check-in" with the merchant using an application on the user device 102a as further described in reference to FIG. 3 and FIG. 9. The user can configure the application to automatically "check-in" with the merchant once the user is within the geo-location radius 206 of the merchant, which will be further described below in reference to FIG. 3. In some implementations, the user can configure the application to set a maximum amount that can be charged per transaction with the merchant.

Checking in with a merchant allows the merchant application to display an option to charge the user's financial account using a cardless payment transaction. In essence, checking in constitutes a consent by the user to conduct a cardless transaction with the merchant. This consent differs from actual authorization of the transaction, which the user would provide, e.g., verbally, upon learning the amount of the transaction.

In some implementations, in order to determine whether user device 102a is within the geo-location radius 206 of the merchant device 104a, the merchant's location, e.g., address, and the geo-location radius 206 for the merchant are provided to the user device 102a. The user device 102a can then use a geofencing function. For example, the user device 102a determines its own location, e.g., based on GPS information, cellphone data, wireless network data, or the like, and then determines whether its own location is within the geo-location radius 206 of the merchant location.

FIG. 3 is a diagram of an example flow chart of process conducted with the cardless payment system 100. The process conducted with the cardless payment system 100 involves relationships between a user's mobile device, a server system, and a merchant's device. As described above, merchants can have multiple merchant devices. Some merchant devices can be in proximity to each other, e.g., located within the same retail store. These merchant devices can be associated with the same location, e.g., an address of the retail store, which is provided to the mobile device. Some merchant devices are not in proximity to each other, e.g., merchant devices located at different store locations. These merchant devices are associated with different locations. These different locations can be provided to the mobile device, and the mobile device can initiate cardless payment transactions with each different location separately even though the locations are associated with the same merchant. The server system can reside in the payment service system 108 and be configured to send and receive communications between the user device and the merchant device. The server system can include the servers 112. The communications can be encrypted using secure protocols built into the user device, server system, and merchant device. In some implementations, this process is implemented through the applications installed on both the user's mobile device and the merchant's device.

In a typical situation, the user launches the user application on the mobile device. The mobile device then displays a graphical user interface (discussed further below with reference to FIG. 9). In launching the user application, the mobile device 102 directs a request to the server system to identify merchants that will perform cardless payment transactions. The request can be accompanied by location information, e.g., as determined by the mobile device 102. The server system receives the request, and selects one or more merchants based on the location information from the customer device and the stored location information for the one or more merchants. At least an identification of the merchant and the location information for the one or more merchants is sent to the mobile device 102. If a merchant has multiple store locations, each store location can be sent as an individual entry in the list of merchants to the mobile device 102. Thus, the list of merchants can be displayed by the mobile device without prior entry of the user of any other search terms or search restrictions.

The user may input a request for further information about a merchant, e.g., tap the name of the merchant in the list displayed by the user application, or press a "More Info" button on the user interface of the user application. In response, the user device can display further information received regarding the merchant, e.g., the list of goods or services available, operating hours, and phone number.

The user sends an indication of consent to perform a cardless payment transaction with the merchant to the server system. For example, the user can request to "check in" with a merchant by interfacing with the user application on the user device (step 302); this request can constitute the indication of consent.

Alternatively, the request to identify a merchant, the display of information concerning the merchant, and/or the indication of consent, could be entered into a computer other than the user device 102, e.g., the user's home computer, that is logged in to the user's account on the payment service system 108. In any event, should the user indicate consent to perform the transaction, at least an identification of the merchant and the location information for the merchant is sent to the mobile device 102.

The mobile device determines whether it is within the predetermined distance from the merchant location (step 304). In some implementations, if the mobile device does not have the current location of the merchant, or if the merchant updated its location information for a set of merchant devices, the merchant location can be pushed or pulled into the mobile device. Whether the mobile device is within the predetermined distance can be determined, e.g., using a geolocation function provided by the operating system of the mobile device. Alternatively, if the user opts in to sharing of location information, the location information of the mobile device can be provided to the server of the payment service system 108, and the server determines the distance between the merchant location and the mobile device.

As described above, if the mobile device determines the user's mobile device is not within a predetermined distance (e.g. 500 feet), the mobile device displays a message indicating its inability to check in (e.g., a "too far to check in" message) and rejects the user's request (step 308). In this case, the mobile device can view information about the merchant, but cannot check in. In other words, the merchant cannot charge the user's financial account using a cardless payment transaction until the user is within the predetermined distance and the merchant has the user's consent.

On the other hand, if the mobile device is within the predetermined distance, the mobile device sends an indication of proximity to the server of the payment service system (step 306). In some implementations, the user can automatically check in. For example, the user first requests to automatically check in with a merchant at the merchant location. While this option is enabled, the mobile device can automatically detect when it is within the predetermined distance and send the indication of proximity. The indication of proximity can be determined using wireless network geo-fencing or GPS signals. In some implementations, if the mobile device is not within the predetermined distance, the user application will not permit the indication of consent to be provided. In some implementations, if the mobile device is not within the predetermined distance when an indication of consent is provided, the user application will require that the user again provide an indication of consent when the mobile device is within the predetermined distance.

After the server receives this indication of proximity, the server system sends the indication of the mobile device's presence and personal identifying information to the appropriate merchant device, e.g., a merchant device at the merchant location selected by the user (step 310). In some implementations, personal identifying information includes the user's name and picture. Upon receipt of this information, the merchant device displays the user's identifying information (step 314) on the graphical user interface (GUI) of the merchant application. In some implementations, through the GUI of the merchant application, the merchant can select items that the user has sought to purchase. The application can be configured to associate individual prices with each of the merchant's items, and the application can automatically sum the total transaction amount that the user owes. In some implementations, the merchant can enter into the application a total sum of prices for all the items the user wishes to purchase, as well as tax or tip. A user can authorize payment for a transaction by verbally notifying the merchant. For example, a user named John Smith can tell the merchant, "Put this on John Smith." Before or after the user authorizes payment for the transaction, the merchant verifies the user's identity (step 316). In some implementations, the merchant ensures the image displayed on the merchant device matches the user who is present in person. Assuming that the image matches, the merchant selects the transaction using the GUI of the merchant application. In some implementations, the merchant can ask the user for more identifying information before processing the transaction such as the user's birthday, address, or other personal identifying information. After verifying the user's identity, the merchant interfaces with the merchant application to start processing the transaction.

In some implementations, the amount to be charged exceeds a predetermined amount set by the user, the merchant or the cardless payment processor. In this case, the user enters in a PIN associated with the user's account into the merchant device. The merchant device verifies the PIN with the server. Alternatively, the server system may communicate with the user device and cause the user device to request that the user enter the PIN into the user device. In yet another alternative, the server system can ask the user to confirm the payment on the user device, removing the need to enter a PIN.

The merchant's device sends a record of the requested transaction to the server (step 318). The server system continues processing the requested transaction (step 320) by sending the record to the computer system of the card payment network 116, e.g., Visa or MasterCard, and the card payment network 116 then sends the record to the card issuer, e.g., the bank, as described above.

If the transaction fails because it would exceed the credit limit or there are insufficient funds in the financial account, the server notifies the merchant application. In some implementations, the server can notify both the merchant application and user application.

If the transaction succeeds and the server system receives approval from the card payment network 116, the server system communicates this to the merchant device. The merchant device then captures the transaction. In the capture stage, the approved transaction is again routed from the merchant to the credit card processor, card network and card issuer. The record of the transaction in the capture stage can the cardholder's signature (if appropriate), or other information. The capture state can trigger the financial transaction between the card issuer and the merchant. On receipt of an indication from the card network that the transaction has been captured, the server system optionally creates receipts to send to the user, e.g., through the user application and/or through the previously provided contact email, and to the merchant (step 322). Both devices then display the receipt in each of their applications (steps 324, 326). Optionally, the user may be permitted to opt out of notification.

Figure 4:
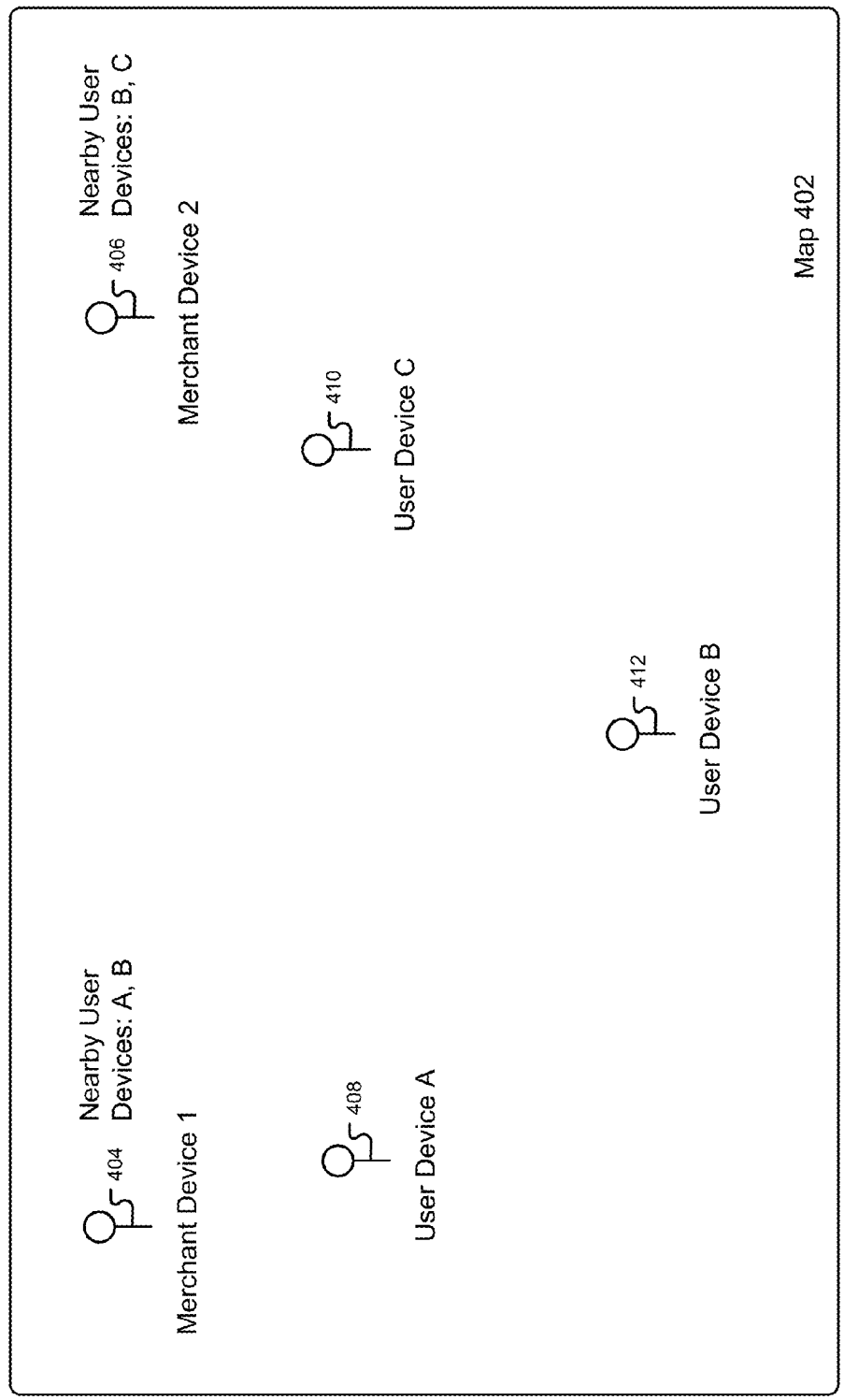
FIG. 4 is a diagram of an example map illustrating multiple user devices near a merchant that has more than one merchant device.

FIG. 4 is a diagram of an example map 402 illustrating a cardless payment system that identifies multiple user devices near a merchant that has more than one merchant device. The user devices and merchant devices can be associated with a cardless payment system (e.g., the devices have an account with the cardless payment system). A merchant can have multiple merchant devices for multiple points of sale. Merchant Device 1 404 is located at a different merchant location than Merchant Device 2 406. Users A, B, and C can be carrying User devices A 408, B 410, and C 412, respectively. User devices A, B, and C 408-412 are located at different places on the map 402. The cardless payment system can provide a list of nearby user devices to merchant devices, as will be described below in reference to FIG. 5. Merchant devices can use the list of nearby devices to assist in completing a cardless payment transaction, e.g., the list can provide identifying information of a user of a nearby device to a merchant.

Figure 5:
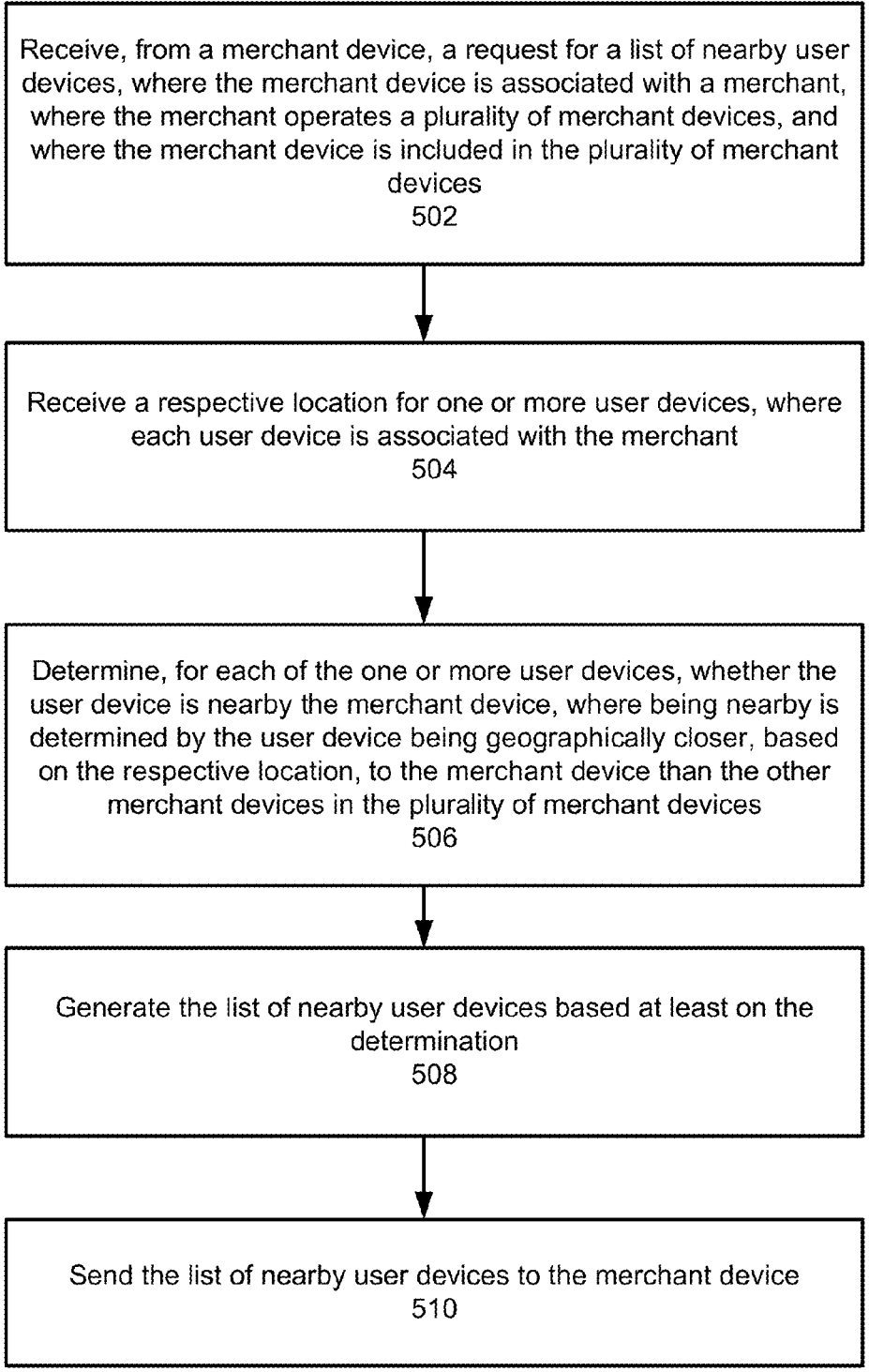
FIG. 5 is a flow chart of an example method of providing nearby customers to a merchant device.

FIG. 5 is a flow chart of an example method 500 of providing nearby users to a merchant device. More than one merchant device can be associated with a common merchant. Each merchant device associated with the common merchant can be provided with various sets of nearby users. Merchant devices can request a list of nearby user devices from the cardless payment system (e.g., using a merchant application). Merchant devices can send this request periodically by polling the cardless payment system, or the cardless payment system can push updates of nearby user devices to the merchant device.

The cardless payment system can receive the request from a merchant device (step 502). Each merchant device is associated with a merchant (e.g., a point of sale machine at a merchant location). The system can receive locations from nearby user devices (step 504). For example, both user and merchant devices can provide their location to the cardless payment system upon startup of a customer/merchant application or periodically as a background process. In some implementations, the user device provides its location to the cardless payment system whenever the user device is authorized to perform a cardless payment transaction, e.g., is "checked in", with the merchant at a merchant location as described above in reference to FIG. 3. The system can store locations when provided by user and merchant devices. For example, in reference to FIG. 4, if Merchant Device 1 404 requests for a list of nearby user devices, the cardless payment system receives the request. The system can receive locations of the nearby user devices. The system can identify one or more user devices that have authorized cardless payment transactions with the merchant (e.g., User Devices A, B, and C 408, 410, and 412 are "checked in" with the merchant).

For a given user device, the system determines which merchant device is geographically closer to the user device compared to other merchant devices (step 506). For example, if locations are represented as longitudes and latitudes, the system can calculate a distance between each user device location and each merchant device location based on the longitudes and latitudes. The system can use the distance to determine proximity between each user device and each merchant device.

The system then generates the list of nearby user devices based at least on the determination (step 508). The list of nearby devices can include identifying information for each user of each nearby device. For a given merchant device, the list of nearby user devices includes user devices that are closer to the merchant device than other merchant devices. Also, for a given merchant device, the list of nearby user devices does not include user devices that are closer to other merchant devices than the given merchant device. The list of nearby devices can be provided to the given merchant device. The merchant device can display identifying information, e.g., a name and/or picture, of the user of the nearby device when running a merchant application.

In review, the system receives an indication that a user with an associated user device is willing to perform a cardless transaction with a merchant. The system identifies the merchant device out of a plurality of merchant devices of the merchant that is closest to the user device. Then the system checks in that particular user at the closest merchant device of the merchant; this merchant device (and not the more distant merchant devices) is the one displayed in any list of merchants on the user device, and this merchant device (and not the more distant merchant devices) is the one that displays the presence of the user.

For example, in reference to FIG. 4, User Device A 408 is closer to Merchant Device 1 404 than Merchant Device 2 406. Therefore, the generated list of nearby user devices for Merchant Device 1 404 includes User Device A. User Device C 410 is closer to Merchant Device 2 than Merchant Device 1. Therefore, the generated list of nearby user devices for Merchant Device 2 includes User Device C 410.

In some implementations, the system determines a user device is similarly distant from multiple merchant devices. For example, User Device B 412 can be similarly distant from Merchant Device 1 404 and from Merchant Device 2 406 within a threshold margin of distance (e.g., 0.2 mile, 0.5 mile, 1 mile, 5 miles, or more). In this case, the system can provide User Device B 412 to both Merchant Device 1 404 and Merchant Device 2 406. Therefore, the generated list of nearby user devices for Merchant Device 1 404 includes User Devices A 408 and B 412. Also, the generated list of nearby user devices for Merchant Device 2 includes User Devices B 412 and C 410. The system can send the generated list of nearby user devices to the merchant device (step 510).

Figure 6A:
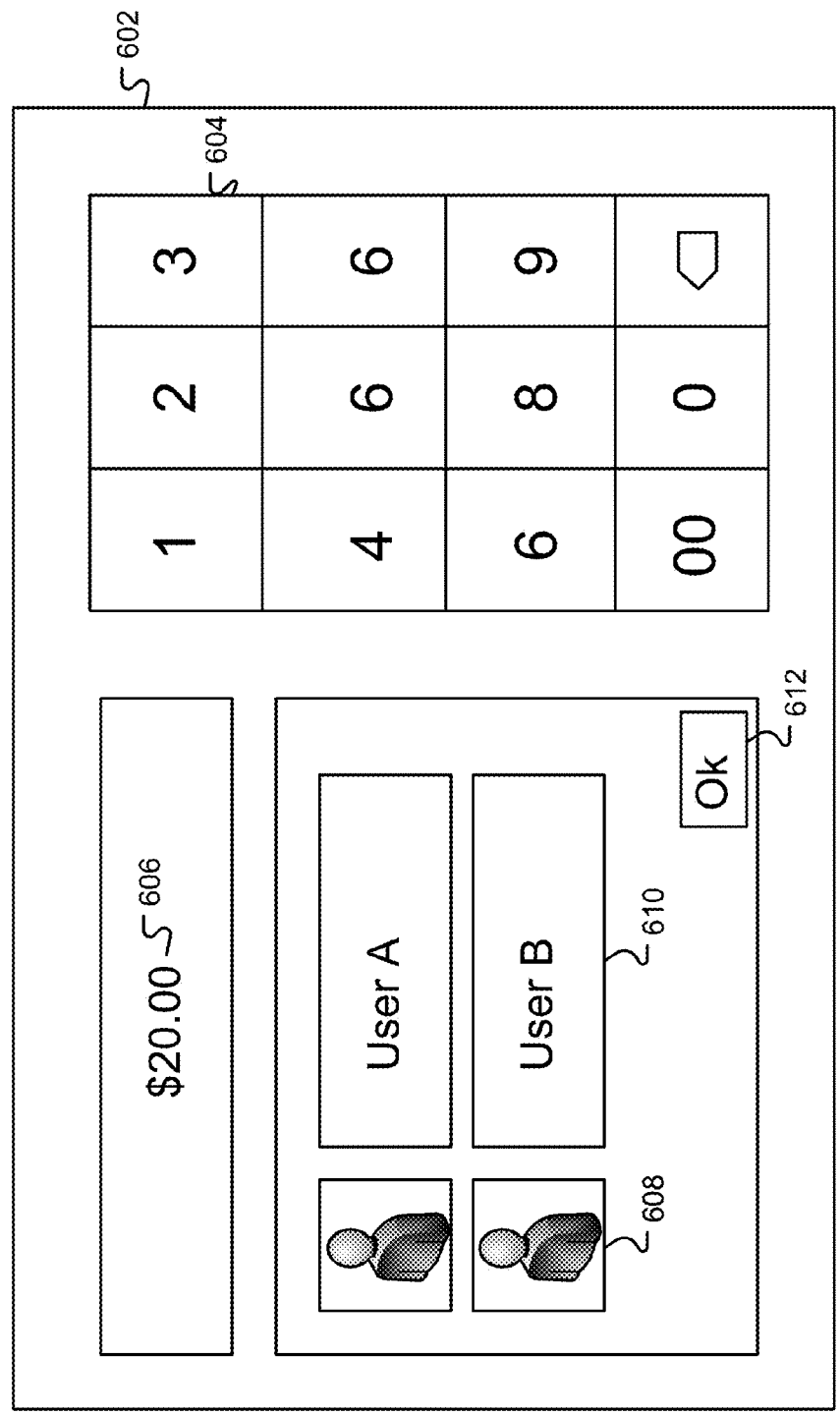
FIGS. 6A-B are diagrams of an example view of a merchant device's application.
Figure 6B:
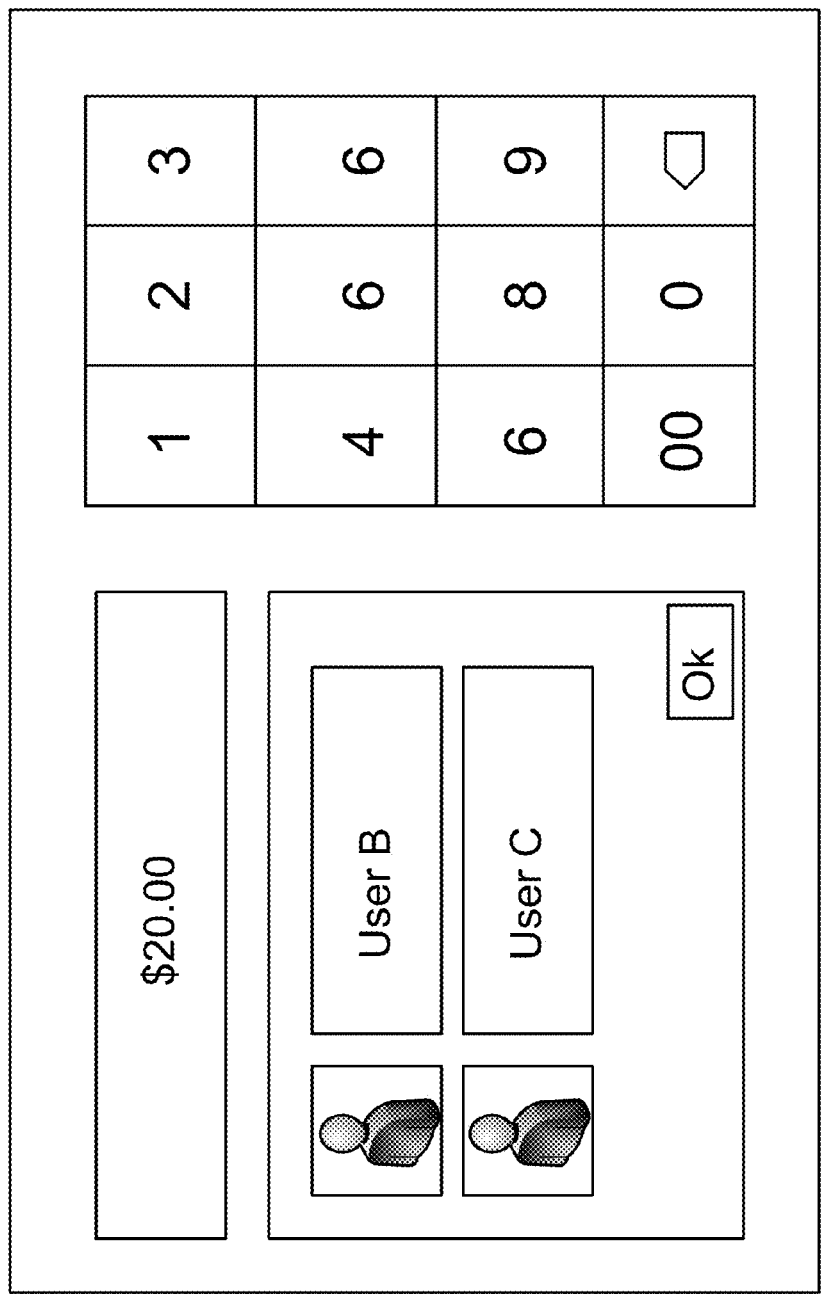

FIGS. 6A-B are diagrams of an example view of a merchant device's application 602. If a user is associated with the cardless payment system (e.g., "checked-in" with the merchant), the device can display the user's identifying information in the application. In some implementations, the identifying information includes the user's name 610, picture 608, phone number, email address, or other personal identifying information. In some implementations, after verifying the user's identity using the identifying information, the merchant enters in an amount 606 into the application using the keypad 604, shows the user the amount to be charged, and taps an "Ok" button to cause the device to process the transaction.

FIG. 6A is a merchant application running on Merchant Device 1 404 in reference to FIG. 4. Merchant Device 1 404 can request for a list of nearby user devices. As described above, User Devices A and B 408, 412 are determined to be nearby Merchant Device 1 404. Merchant Device 1 404 receives the generated list of nearby user devices including User Devices A and B 408, 412. Therefore, the merchant application can display users A and B on the merchant device. The merchant application will not display user C because User Device C is located closer to another merchant device (e.g., Merchant Device 2 406) of the merchant.

FIG. 6B is a merchant application running on Merchant Device 2 406 in reference to FIG. 4. Merchant Device 2 406 can request for a list of nearby user devices. As described above, User Devices B and C 410, 412 are determined to be nearby Merchant Device 2 406. Merchant Device 2 406 receives the generated list of nearby user devices including User Devices B and C 410, 412. Therefore, the merchant application can display users B and C on the merchant device. The merchant application will not display user A because User Device A is located closer to another merchant device (e.g., Merchant Device 1 404) of the merchant.

Figure 7:
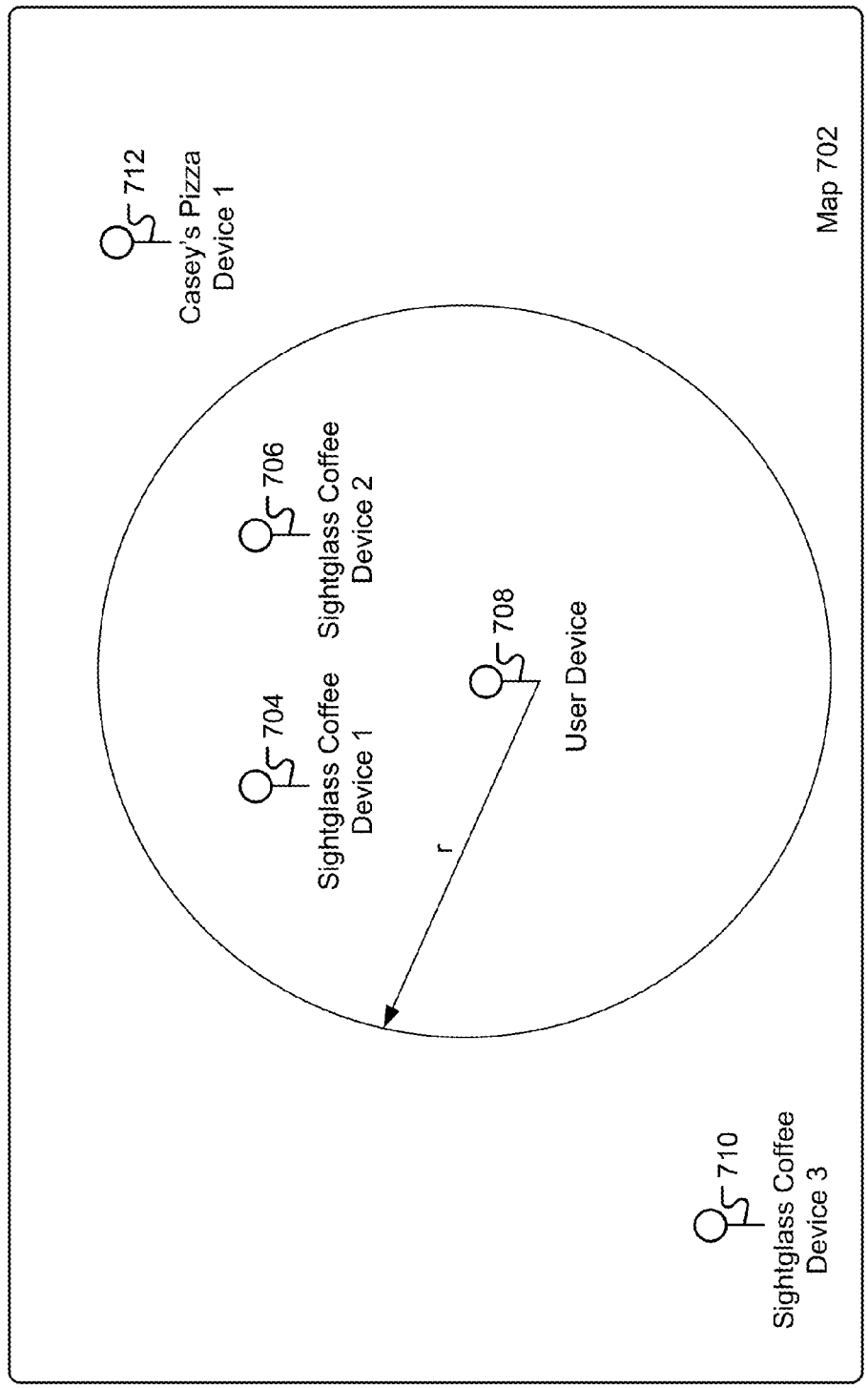
FIG. 7 is an example diagram of a customer device near multiple merchant devices at one merchant location.

FIG. 7 is an example map 702 of a cardless payment system that identifies a user device 708 near multiple merchant devices. The user devices and merchant devices can be associated with a cardless payment system (e.g., the devices have an account with the cardless payment system). The system can detect a radius (e.g., radius r) around a user device's location. Merchant devices can be located at various merchant locations. For example, the merchant Sightglass Coffee has three merchant devices. Two of them, Sightglass Coffee Device 1 704 and Sightglass Coffee Device 2 706, are located at one merchant location and are within a radius of the user device's location. Sightglass Coffee Device 3 710 is located at another merchant location. The system can also identify merchants that have one merchant device (e.g., Casey's Pizza Device 1 712). The cardless payment system can provide a list of nearby merchant devices to user devices, as will be described below in reference to FIG. 8.

Figure 8:
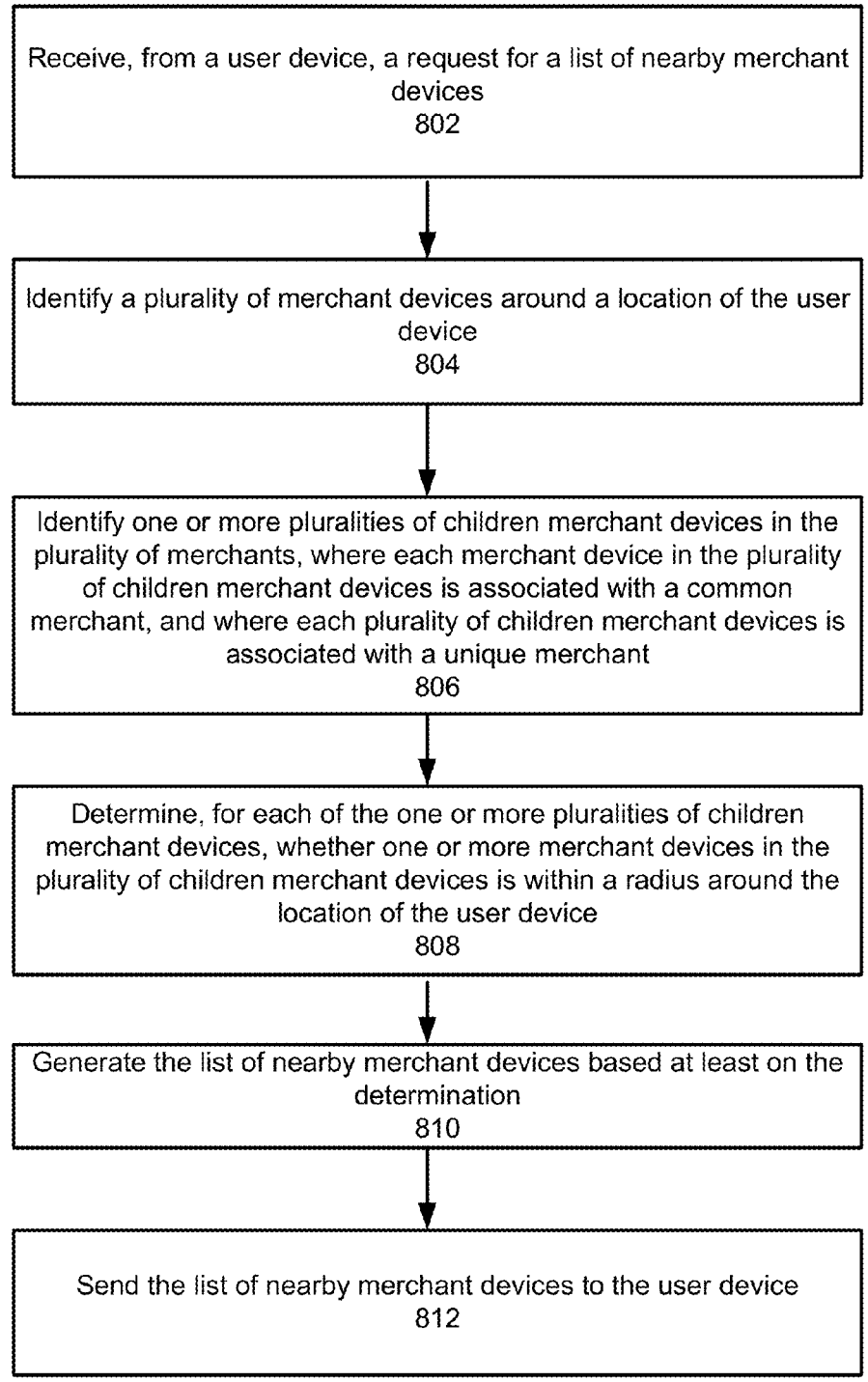
FIG. 8 is a flow chart of an example method of providing nearby merchant devices to a customer.

FIG. 8 is a flow chart of an example method 800 of providing nearby merchant devices to a user device. User devices can request a list of nearby merchant devices from the cardless payment system (e.g., using a user application).

The cardless payment system can receive the request from a user device for a list of nearby merchant devices (step 802). In some implementations, the request includes a location of the user device. The system can identify a plurality of merchant devices around the location of the user device (step 804). For example, the system can query a merchant database for the information based on the location. The merchant database can include information of one or more children merchant devices that are associated with the merchant. Children merchant devices are merchant devices that are associated with a common merchant. For example, in reference to FIG. 7, "Sightglass Coffee" is a common merchant that has three children merchant devices 704, 706, 710.

The system identifies one or more pluralities of children merchant devices (e.g., from a merchant database) (step 806). Each plurality of children merchant devices can be associated with a unique merchant. For example, in reference to FIG. 7, one plurality of children merchant devices is associated with the merchant "Sightglass Coffee."

The system determines, for each of the one or more pluralities of children merchant devices, whether one or more merchant devices in the plurality of children merchant devices is within a radius around the location of the user device (step 808). For example, in reference to FIG. 7, the one or more merchant devices within a radius around the location of the user device includes Sightglass Coffee Device 1 704 and Sightglass Coffee Device 2 706. Sightglass Coffee Device 3 710 is not within the one or more merchant devices because Sightglass Coffee Device 3 710 is outside of the radius around the location of the user device.

The system can generate the list of nearby merchant devices based on the determination (step 810). Even if there are multiple children merchant devices in the radius, the list of nearby merchant devices includes one merchant listing that represents both merchant devices. For example, in reference to FIG. 7, Sightglass Coffee has two merchant devices within the radius. The generated list of nearby merchant devices will select one of the two merchant devices (e.g., either Sightglass Coffee Device 1 704 or Sightglass Coffee Device 2 706). If there were 10 or 20 Sightglass Coffee Devices within the radius, the generated list of nearby merchant devices will include only one of the merchant devices. In some implementations, the system selects the merchant device closest to the user device. In some other implementations, the system selects the merchant device that is a primary point of sale for the merchant location. The generated list also includes children merchant devices that are outside the radius (e.g., Sightclass Coffee Device 3 710 and Casey's Pizza Device 1 712). An example of the list of nearby merchants is described below in reference to FIG. 9. The system can send the generated list of nearby merchant devices to the user device (e.g., using the Internet) (step 812).

FIG. 9 is a diagram of example view of a user application's main page on a user's mobile device. The user application can retrieve a list of merchants 912 in response to an application query (e.g., on startup of the application). The application can display the list of merchants 912.

As mentioned above, in reference to FIG. 7, Sightglass Coffee has three merchant devices, but the cardless payment system provides a list of nearby merchants that includes two merchant listings to the user device. For example, the "Sightglass Coffee" listing that is 3 miles away represents Sightglass Coffee Device 3 710. The "Sightglass Coffee" listing that is 1 mile away represents either Sightglass Coffee Device 1 or 2 704, 706.

The list of merchants can be organized into a plurality of rows, each row containing the name 912a of a single merchant. The list can also include an icon 912b for each merchant, e.g., located in the row with the name of the merchant. For example, each merchant's icon 912b can be located on the left side of the name 912a of the merchant. In some implementations, a cover image 908 for a merchant, e.g., the first merchant in the list, is displayed. The application can display a distance 910 that a merchant is from a current location of the mobile device. Again, the distance 910 can be located in the row with the name 912a of the merchant, e.g., on the right side of the name 912 of the merchant.

Each merchant can be represented with a custom-designed "card". In some implementations, tapping the row containing the name 912a of the merchant, or tapping the name 912a of the merchant, will cause the user's mobile device to display more information regarding the respective merchant. In some implementations, the additional merchant information is represented by a custom-designed merchant page. For example, the mobile device can display a map around the merchant's area, the merchant's phone number, the merchant's operating hours, or other merchant information.

The application can present user account information by tapping an account button 902. When provided with input, the application can search for merchants in a search bar 904. For example, the application can send the search query to a cardless payment system and be provided with merchants that are relevant to the search query. Tapping a 'favorites' button 906 can cause the application to retrieve a list of favorites from the cardless payment system and display a list of favorite merchants selected by the user.

To select a favorite, a user can perform a side swipe motion on a merchant listing. This can cause the application to bring up a list of options related to the merchant. For example, the application can display options to favorite the merchant or share the merchant using different communication protocols (e.g., email or social network sharing). If a user selects a merchant as a favorite, the application sends the user's selection to the cardless payment system and associates the selection with the user's account.

If the current location of the mobile device is within a predetermined distance of a merchant, the application can display a representative symbol (e.g., "Check-in" button 914). By tapping the check in button, the application can perform the check in step described above in reference to FIG. 3. If the mobile device's current location is not within the predetermined distance, the application can display a distance 910 from the mobile device to the merchant. The application also allows the user to "Explore Places" 916. In some implementations, this opens a list of nearby or featured merchants that are associated with the cardless payment system. A user then has an option to learn more about one of the merchants in the list.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a non-transitory computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:
1. A computer-implemented method comprising:
   receiving, from a user device, a request for information about nearby merchants that perform cardless payment transactions, wherein a nearby merchant is a merchant having at least one merchant device that is within a threshold distance to the user device, and wherein the request includes a location of the user device;
   identifying a plurality of merchant devices that are located within the threshold distance to the location of the user device, at least a first merchant device and a second merchant device of the plurality of merchant devices being associated with a particular merchant;
determining that the particular merchant is associated with the first merchant device and the second merchant device of the plurality of merchant devices that are located within the threshold distance of the location of the user device;
generating a merchant entry for the particular merchant, the merchant entry representing the first merchant device and the second merchant device that are within the threshold distance of the location of the user device;
generating a presentation of a plurality of merchant entries representing nearby merchant devices, the presentation including the merchant entry;
providing the presentation for display by the user device in response to the request for information about nearby merchants that perform cardless payment transactions; and
receiving, from the user device, an indication of consent to perform a cardless payment transaction with the particular merchant.

2. The method of claim 1, wherein receiving the indication of consent comprises receiving, from the user device, an indication of customer consent for the particular merchant to perform the cardless payment transaction using the first merchant device represented by the merchant entry, the first merchant device being closer to the user device than the second merchant device.

3. The method of claim 1, wherein receiving the indication comprises receiving, from the user device, an indication of customer consent for the particular merchant to perform the cardless payment transaction using a primary sales device of the particular merchant, the primary sales device being the first merchant device represented by the merchant entry.

4. The method of claim 1, further comprising:
identifying that the first merchant device is closer to the user device than the second merchant device; and
selecting the first merchant device for performing the cardless payment transaction.

5. The method of claim 1, further comprising:
identifying that the first merchant device includes a primary merchant device associated with the particular merchant; and
selecting the first merchant device for performing the cardless payment transaction.

6. A method comprising:
receiving, from a user device, a request for information about nearby merchants that perform cardless payment transactions;
identifying a plurality of merchant devices that are located within a threshold distance to a location of the user device, at least a first merchant device and a second merchant device of the plurality of merchant devices being associated with a particular merchant;
determining that the particular merchant is associated with the first merchant device and the second merchant device of the plurality of merchant devices that are located within the threshold distance to the location of the user device;
generating a presentation of nearby merchants for display at the user device, the presentation including a single merchant entry representing the first merchant device and the second merchant device;
providing, to the user device, the presentation of nearby merchants for display at the user device; and
receiving, from the user device, an indication of consent to perform a cardless payment transaction with the particular merchant.

7. The method of claim 6, wherein receiving the indication of consent comprises receiving, by a payment service system, and from the user device, an indication of customer consent for the particular merchant to perform the cardless payment transaction using the first merchant device represented by the single merchant entry, wherein the first merchant device is closer to the user device than the second merchant device.

8. The method of claim 6, wherein receiving the indication of consent comprise receiving, by a payment service system, and from the user device, an indication of customer consent for the particular merchant to perform the cardless payment transaction using a primary sales device of the particular merchant, the primary sales device being the first merchant device represented by the single merchant entry.

9. The method of claim 6, wherein generating the presentation comprises generating a second merchant entry for at least one merchant device that is not located within the threshold distance to the location of the user device.

10. A system comprising:
one or more computers and one or more storage devices storing instructions that are operable, when executed by the one or more computers, to cause the one or more computers to perform operations comprising:
receiving, from a user device, a request for information about nearby merchants that perform cardless payment transactions;
identifying a plurality of merchant devices that are located within a threshold distance to a location of the user device, at least a first merchant device and a second merchant device of the plurality of merchant devices being associated with a particular merchant;
determining that the particular merchant is associated with the first merchant device and the second merchant device of the plurality of merchant devices that are located within the threshold distance to the location of the user device;
generating a merchant entry for the particular merchant, the merchant entry representing the first merchant device and the second merchant device that are located within the threshold distance of the location of the user device;
generating a presentation of nearby merchants for display at the user device, the presentation including the merchant entry;
providing, to the user device, the presentation of nearby merchants for display at the user device; and
receiving, from the user device, an indication of consent to perform a cardless payment transaction with the particular merchant.

11. The system of claim 10, wherein receiving the indication comprises receiving, by a payment service system, and from the user device, an indication of customer consent for the particular merchant to perform the cardless payment transaction using the first merchant device represented by the merchant entry, wherein the first merchant device is closer to the user device than the second merchant device.

12. The system of claim 10, wherein receiving the indication comprises receiving, by a payment service system, and from the user device, an indication of customer consent for the particular merchant to perform the cardless payment transaction using a primary sales device of the particular merchant, the primary sales device being the first merchant device represented by the merchant entry.

13. The system of claim 10, the operations further comprising generating a second merchant entry for at least one merchant device that is not located within the threshold distance to the location of the user device, and wherein the presentation of nearby merchants further includes the second merchant entry.

14. The system of claim 10, wherein the operations further comprise:
 identifying that the first merchant device is closer to the user device than the second merchant device; and
 selecting the first merchant device for performing the cardless payment transaction.

15. A computer program product, encoded on one or more non-transitory computer storage media, comprising instructions that when executed by one or more computers cause the one or more computers to perform operations comprising:
 receiving, from a user device, a request for information about nearby merchants that perform cardless payment transactions;
 identifying a plurality of merchant devices that are located within a threshold distance to a location of the user device, at least a first merchant device and a second merchant device of the plurality of merchant devices being associated with a particular merchant;
 determining that the particular merchant is associated with the first merchant device and the second merchant device of the plurality of merchant devices that are located within the threshold distance to the location of the user device;
 generating a presentation of nearby merchants for display at the user device, the presentation including a single merchant entry representing the first merchant device and the second merchant device;
 providing, to the user device, the presentation of nearby merchants for display at the user device; and
 receiving, from the user device, an indication of consent to perform a cardless payment transaction with the particular merchant.

16. The computer program product of claim 15, wherein receiving the indication of consent comprises receiving, by a payment service system, and from the user device, an indication of customer consent for the particular merchant to perform the cardless payment transaction using the first merchant device represented by the single merchant entry, wherein the first merchant device is closer to the user device than the second merchant device.

17. The computer program product of claim 15, wherein receiving the indication of consent comprises receiving, by a payment service system, and from the user device, an indication of customer consent for the particular merchant to perform the cardless payment transaction using a primary sales device of the particular merchant, the primary sales device being the first merchant device represented by the single merchant entry.

18. The computer program product of claim 15, wherein generating the presentation comprises generating a second merchant entry for at least one merchant device that is not located within the threshold distance to the location of the user device.

* * * * *